Mar. 3, 1925.
W. J. SHEEHAN
WINDOW CLEANER
Filed Jan. 22, 1923
1,528,272
2 Sheets-Sheet 1
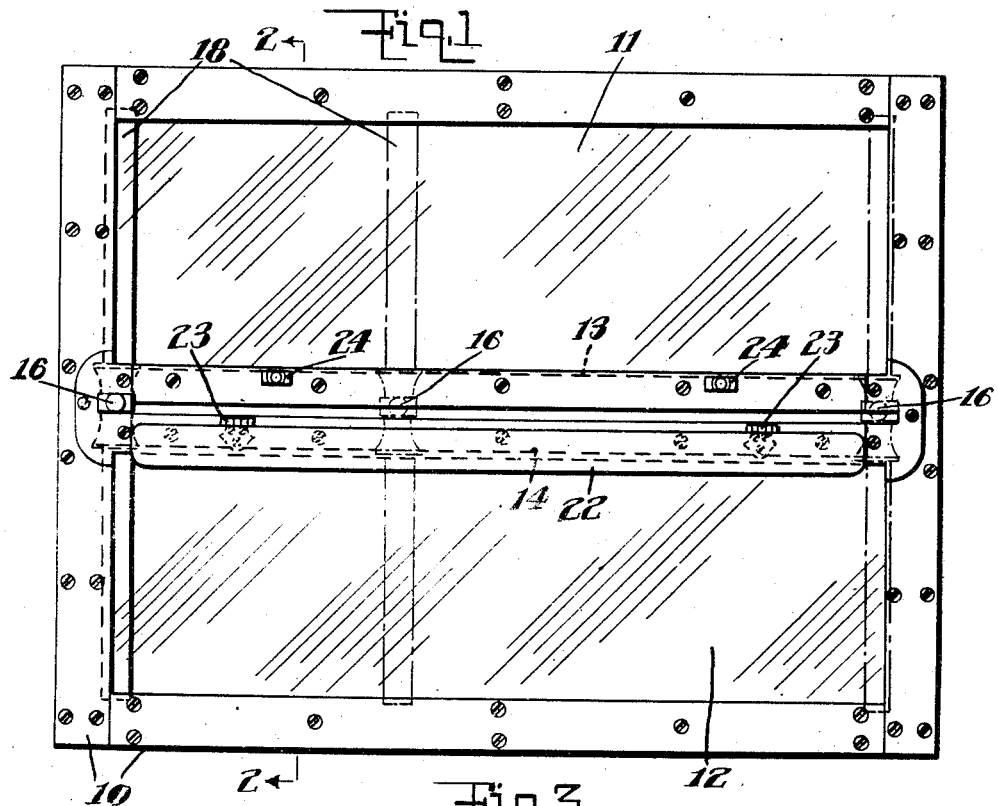
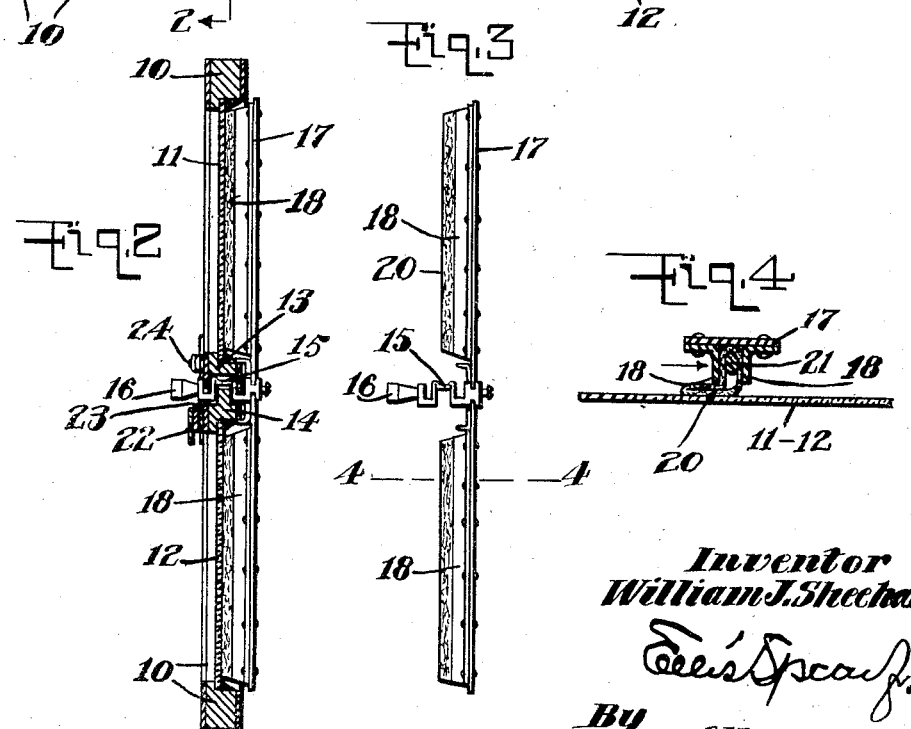
Inventor
William J. Sheehan
By Ellis Spear Jr.
Attorney Mar. 3, 1925.
W. J. SHEEHAN
WINDOW CLEANER
Filed Jan. 22, 1923
1,528,272
2 Sheets-Sheet 2
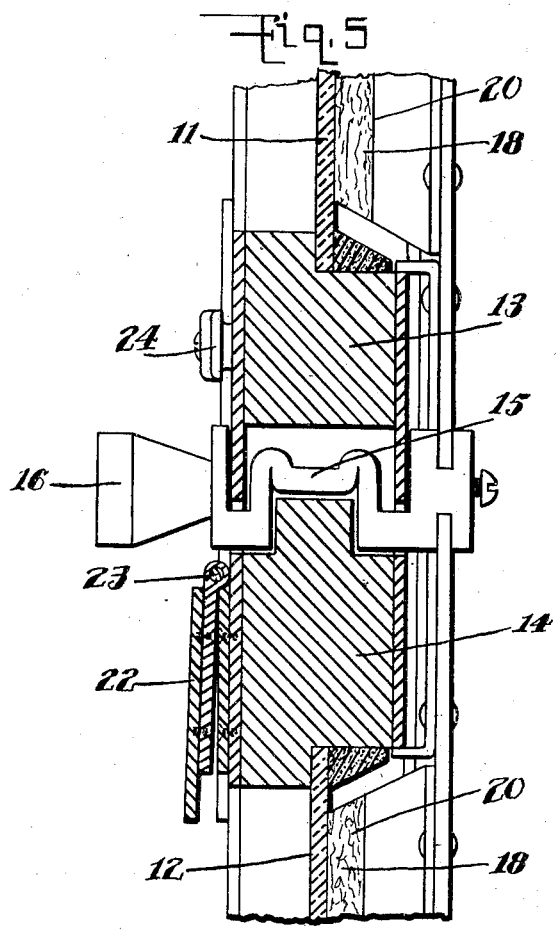
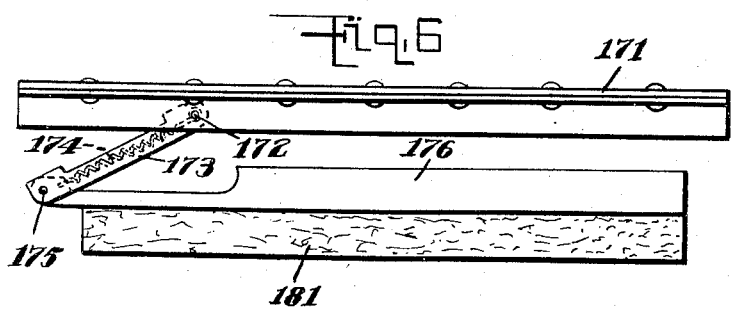
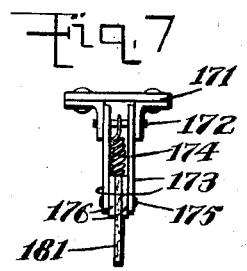
Inventor
William J. Sheehan
By Ellis Spear Jr.
Attorney Patented Mar. 3, 1925.

1,528,272

UNITED STATES PATENT OFFICE.

WILLIAM J. SHEEHAN, OF MEDFORD, MASSACHUSETTS.

WINDOW CLEANER.

Application filed January 22, 1923. Serial No. 614,128.

*To all whom it may concern:*

Be it known that I, WILLIAM J. SHEEHAN, a citizen of the United States, residing at Medford, county of Middlesex, Commonwealth of Massachusetts, have invented certain new and useful Improvements in Window Cleaners, of which the following is a specification.

The object of this invention is to provide simple but effective means for conveniently and quickly removing frost, condensations and snow from windows and more particularly from the windows of trolley cars, windshields of automobiles and the like. With that end in view I have provided the device illustrated in the annexed drawings which is illustrative of my invention.

In these drawings:

Fig. 1 is an elevation of an installation involving my present invention.

Fig. 2 an enlarged transverse sectional view thereof on the line 2—2 of Fig. 1.

Fig. 3 is a detached side elevation of the slidable squeegee member.

Fig. 4 is a transverse section on the line 4—4 of Fig. 3, and Fig. 5 is an enlarged fragmentary section corresponding to Fig. 2 and particularly showing the slidable metallic frame which operates in the space between the sections of the windshield.

Fig. 6 is a side view of a modification of my wiping member, and

Fig. 7 an end view of the same.

Briefly described, the illustrative embodiment comprises a squeegee or wiping member guided for a traversing movement.

Referring to the annexed drawings I have indicated at 10 the pane carrying members having mounted therein upper and lower panes of glass indicated at 11 and 12, said panes being spaced apart and supported in the rails 13 and 14. Mounted to slide on the rail 14 is a metallic frame 15 having a projected handle 16 and having fixedly secured to its rear a vertical bar 17 which is of such length that it extends upwardly almost to the upper edge of the pane 11 and downwardly almost to the lower edge of the lower pane 12. On the inner face of said bar 17 are spaced angle bars 18 as seen in Fig. 4, and between said angle bars I insert a double edge portion of a strip of rubber 20 and wedge the said rubber tightly between the angle bars by means of a spreader strip 21. The free edges of the rubber are of such width that they project beyond the angle bars and lie against the panes, as seen in Fig. 4.

In practice a squeegee thus provided is moved from side to side on the pane. The rubber is held tightly against the glass so as to effectively wipe off all moisture. Ordinarily a single movement of the squeegee across the glass and back again is sufficient to clear the pane. While I have shown as the simplest form a hand operated squeegee, it is obvious that the squeegee may be traversed between its guide rails 13 and 14 by any suitable means which may be continuously acting or which may be set in operation as desired. In all such movements owing to the guided relation of the rails 13 and 14 on the slide frame, the wiper bar 17 is always held in a vertical position and is always guided in definite relation to the face of the pane to be wiped, so that the wiping edges of the squeegee will always traverse it a proper distance from the surface of the glass.

When the cleaner is not in service the opening between the upper and lower panes is closed by means of a plate 22 which is hinged to one of the guide rails as at 23 and may be fastened in its closed position by buttons 24. Whenever it is necessary or desirable to use the squeegee the plate 22 is unbuttoned and lowered (see Fig. 5). The handle 16 may be grasped and the squeegee moved across the glass and back as desired and when not in use may be returned to its inoperative position as indicated in full lines in Fig. 1. The plate 22 may then be closed again thus not only sealing the guiding passage between the rails, but also locking the handle 16 so that the squeegee is held at one side or the other of the pane. This operation may be quickly and easily accomplished by the motorman of an electric car or by the chauffeur of an automobile without substantial change of position.

In the form of wiper shown in Figs. 6 and 7, I provide a bar 171 to which is pivoted at 172 a short arm 173. This arm which is of sheet metal is folded on itself and encloses a spring 174 which is attached just inside the fulcrum 175 to a second arm 176. This arm 176 carries the rubber wiping strip 181. By this construction the wiping strip 181 is maintained in parallelism with the glass while under the tension of the spring 174.

My described device may be very cheaply provided in connection with windows and windshields of the type referred to, and it has the desirable advantage that it does not interfere with vision when not in operation.

What I therefore claim and desire to secure by Letters Patent is:—

1. The combination in a windshield having a space between the sections thereof constituting a guideway extending the length of the windshield, of a wiper comprising a metallic frame disposed within said guideway and having sliding bearing on the adjacent edge of one of the windshield sections, and at one end provided with an operating handle and at its other end provided with a squeegee carrying member, a shutter hinged to the inner face of one of the windshield sections adjacent said guideway space and adapted to be swung into position to substantially close said space, and fastening means for releasably locking said shutter closed.

2. The combination in a windshield having a space between the sections thereof constituting a guideway extending the length of the windshield, of a wiper comprising a metallic frame disposed within said guideway and having sliding bearing on the adjacent edge of one of the windshield sections, and at one end provided with a squeegee carrying member, a shutter hinged to the inner face of one of the windshield sections adjacent said guideway space and adapted to be swung into position to substantially close said space, and fastening means for releasably locking said shutter closed, said shutter when closed and when the squeegee is at the extreme limit of its sliding travel in either direction engaging the metallic frame and locking the squeegee against movement in said guideway.

In testimony whereof I affix my signature in presence of two witnesses.

WILLIAM J. SHEEHAN.

Witnesses:
MARIAN F. WEISS,
VICTORIA LOWDEN.